(12) United States Patent
Moon

(10) Patent No.: US 7,337,770 B2
(45) Date of Patent: Mar. 4, 2008

(54) OXYGEN ENRICHMENT FOR INTERNAL COMBUSTION ENGINES

(76) Inventor: Joon Moon, 500 E. Broadway, Suite 510, Vancouver, WA (US) 98660

( * ) Notice: Subject to any disclaimer, the term of this patent is extended or adjusted under 35 U.S.C. 154(b) by 90 days.

(21) Appl. No.: 11/286,462

(22) Filed: Nov. 24, 2005

(65) Prior Publication Data

US 2007/0101975 A1 May 10, 2007

Related U.S. Application Data

(60) Provisional application No. 60/733,680, filed on Nov. 5, 2005.

(51) Int. Cl.
*F02B 23/00* (2006.01)
(52) U.S. Cl. ............... 123/585; 123/587; 123/590
(58) Field of Classification Search ........... 123/585, 123/539, 587, 590, 586, 26
See application file for complete search history.

(56) References Cited

U.S. PATENT DOCUMENTS

| 5,517,978 | A | * | 5/1996 | Yi .......................... 123/585 |
| 5,640,845 | A | * | 6/1997 | Ng et al. ..................... 60/274 |
| 5,649,517 | A | * | 7/1997 | Poola et al. .................. 123/585 |
| 5,908,023 | A | * | 6/1999 | Stutzenberger ............... 123/704 |
| 5,960,777 | A | * | 10/1999 | Nemser et al. ................ 123/585 |
| 6,453,893 | B1 | * | 9/2002 | Coleman et al. .............. 123/585 |
| 6,543,428 | B1 | * | 4/2003 | Blandino et al. .............. 123/585 |
| 6,640,794 | B2 | * | 11/2003 | Weber ........................ 123/585 |
| 6,722,352 | B2 | * | 4/2004 | Smolarek et al. ............. 123/585 |
| 7,100,543 | B2 | * | 9/2006 | Davidson ...................... 123/26 |

* cited by examiner

*Primary Examiner*—Stephen K. Cronin
(74) *Attorney, Agent, or Firm*—Berkeley Law & Technology Group, LLP; Paul J. Fordenbacher, Esq.

(57) ABSTRACT

In accordance with embodiments of the present invention, a system is provided comprising an oxygen-enrichment reverse osmosis unit coupled to an intake of an internal combustion engine. Ambient air is supplied to the reverse osmosis unit via an ambient-air inlet and oxygen-enriched air is output via an oxygen-enriched outlet. The oxygen-enriched outlet is coupled to the intake of a combustion chamber of the internal combustion engine. Providing oxygen-enriched air relative to ambient air to the internal combustion engine allows for reducing the size of the combustion chamber while providing equivalent power, resulting in a smaller engine. At the same time, the smaller engine saves consumption of fuel due to lower engine weight and more complete combustion. The smaller engine is also cheaper to build because it requires less material for fabrication.

5 Claims, 4 Drawing Sheets ered out via an oxygen-reduced outlet 14. The oxygen-enriched outlet 12 is coupled to the intake 22 of a combustion chamber (not shown) of the internal combustion engine 20.

OXYGEN ENRICHMENT FOR INTERNAL COMBUSTION ENGINES

RELATED APPLICATION

This application claims priority from U.S. Provisional Application Ser. No. 60/733,680, filed Nov. 5, 2005, the contents of which are hereby incorporated by reference as if recited in full herein for all purposes.

FIELD

The present invention is related to oxygen enrichment, and more particularly, to methods and apparatus for increasing oxygen concentration in the combustion chamber of an internal combustion engine.

BACKGROUND

Air is made up of approximately 20 percent oxygen and 80 percent nitrogen. The oxygen in the air is used as an oxidizer to support combustion of the fuel. When air is used for internal combustion purposes, nitrogen is basically inert in that it does not contribute to the combustion of fuel. The nitrogen is compressed and exhausted along with the oxygen, while occupying combustion chamber volume and consuming energy (compression and heating) without any contribution to the combustion process.

If the ratio of oxygen to nitrogen of the air supplied to the combustion chamber of the internal combustion engine is somehow increased above typical ambient ratios, the combustion chamber would need less volume of this oxygen-enriched air in order to support the same amount of combustion of fuel. For example, if the air was enhanced to about a 40/60 oxygen/nitrogen ratio, only about half of the volume of this oxygen-enhanced air would be needed in order to support about the same amount of combustion of fuel, as compared with the about 20/80 ratio of typical ambient air. A smaller combustion chamber volume and thus a smaller engine could be fabricated that would produce about the same power using this oxygen-enriched air as compared with a bigger engine using ambient air. At the same time, the smaller engine would save consumption of fuel due to lower engine weight and more complete combustion. The smaller engine would also be cheaper to build because it requires less material for fabrication.

In addition, a higher oxygen level in the combustion chamber would reduce carbon monoxide (CO) emissions, hydrocarbon and NOX emission by acting as if the fuel was oxygenated. A higher oxygen level in the intake air would make it unnecessary to have oxygenated fuel and thus the fuel would be less expensive at a given level of emission. This would make vehicle operation less expensive. Another benefit would be a reduced or no need for a catalytic converter due to lower emissions using oxygen-enriched intake air at a given emission level. Since the engine with given power production level is smaller, there would be more room in the automobile to be used for other purposes, such as storing batteries and other equipment needed for hybrid vehicles.

Methods and apparatus for the oxygen enrichment of intake air for internal combustion engines are needed in the art.

BRIEF DESCRIPTION OF THE DRAWINGS

Like reference numbers generally indicate corresponding elements in the figures.

DETAILED DESCRIPTION

Figure 1:
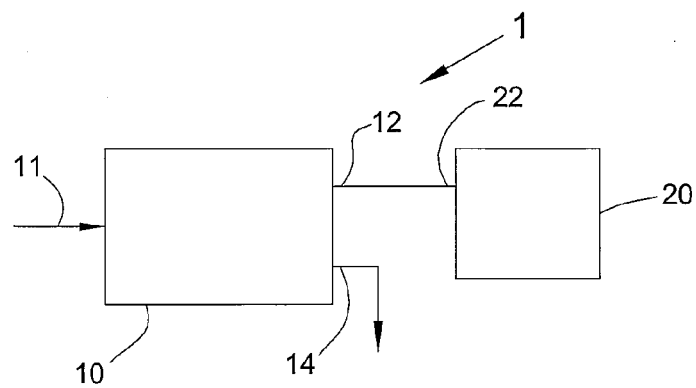
FIG. 1 is a schematic representation of a system comprising an oxygen-enrichment reverse osmosis unit coupled to an intake of an internal combustion engine, in accordance with an embodiment of the present invention.

References will now be made to embodiments illustrated in the drawings and specific language which will be used to describe the same. It will nevertheless be understood that no limitation of the scope of the invention is thereby intended, such alterations and further modifications in the illustrated devices, as such further applications of the principles of the invention as illustrated therein as being contemplated as would normally occur to one skilled in the art to which the invention relates.

Embodiments in accordance with the present invention relate to providing oxygen-enriched air to the intake of a combustion chamber of an internal combustion engine.

FIG. 1 is a schematic representation of a system 1 comprising an oxygen-enrichment reverse osmosis unit 10 coupled to an intake 22 of an internal combustion engine 20, in accordance with an embodiment of the present invention. Ambient air is supplied to the reverse osmosis unit 10 via an ambient-air inlet 11 and oxygen-enriched air is output via an oxygen-enriched outlet 12 and oxygen-reduced air is output via an oxygen-reduced outlet 14. The oxygen-enriched outlet 12 is coupled to the intake 22 of a combustion chamber (not shown) of the internal combustion engine 20.

The reverse osmosis unit 10 produces an oxygen-enriched stream from the oxygen-enriched outlet 12 and an oxygen-reduced stream of air from the oxygen-reduced outlet 14 via a reverse osmosis apparatus (not shown). This is accomplished through one of a number of well known reverse osmosis processes and apparatus including those utilizing permeable polymeric membranes in configurations of film membranes, spiral wound membranes, and hollow fibers, among others, for the separation of oxygen from nitrogen in an air stream. Though common membrane materials suitable for the particular purpose are characterized by a relatively high permeability to oxygen and relatively low permeability to nitrogen, membranes that have a relatively high permeability to nitrogen and relatively low permeability to oxygen can also be utilized in this application for producing oxygen-enriched and oxygen-reduced air streams. The ambient air is presented to the membrane wherein either oxygen or nitrogen, depending on the membrane material, is permitted to permeate through membrane creating an oxygen-enriched air stream on one side of the membrane and an oxygen-reduced air stream on the other side of the membrane.

Many factors influence the amount of oxygen or nitrogen permeation through the membrane. These factors include, but are not limited to, air contact time with the membrane, air pressure, and temperature. The reverse osmosis unit 10 is adapted to produce a predetermined volume of a predetermined concentration or range of concentration of oxygen in the oxygen-enriched air stream. This can be accomplished, among other ways, by providing one or more reverse osmosis stages.

A more complete description of such a membrane and it's configuration within the reverse osmosis apparatus, to the extent necessary to a complete understanding of the present invention, may be found in U.S. Pat. No. 3,228,877, U.S. Pat. No. 3,832,830, U.S. Pat. No. 4,198,213, U.S. Pat. No. 4,508,548, and U.S. Pat. No. 4,560,394. While a detailed description of this specific structure in operation of such a reverse osmosis apparatus is not necessary to a complete understanding of the present invention, it is to be noted that such continuously operating type separation devices are most efficient when a substantial pressure differential is maintained across the membrane.

Pressurized ambient air is supplied to the reverse osmosis apparatus of the reverse osmosis unit 10 at a predetermined pressure by any suitable pressure source. The pressure source may be supplied via ram air pressure wherein the system 1 is moving, such as, but not limited to, a moving vehicle. The air pressure may also be supplied mechanically, such as, but not limited to, by a compressor where the system 1 is in a stationary configuration or a moving configuration where the ram air pressure is not sufficient. The compressor may be any known apparatus used to compress or pressurize air, such as, but not limited to, centrifugal, rotary screw and reciprocating compressors.

Figure 2:
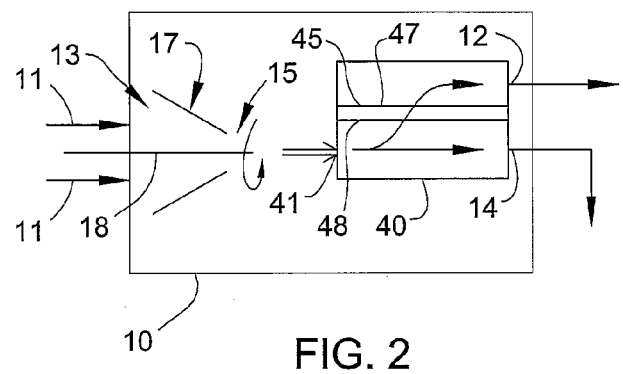
FIG. 2 is a schematic representation of an oxygen-enrichment reverse osmosis unit, in accordance with an embodiment of the present invention.

FIG. 2 is a schematic representation of an oxygen-enrichment reverse osmosis unit 10, in accordance with an embodiment of the present invention. The reverse osmosis unit 10 comprises a compressor 17 for producing a supply of pressurized air and a reverse osmosis apparatus 40 adapted for continuously dividing the supply of pressurized air into an oxygen-enriched stream and an oxygen-reduced stream. The compressor comprises a compressor inlet 13 and a compressor outlet 15. The compressor is any known apparatus used to compress or pressurize air, such as, but not limited to, centrifugal, rotary screw and reciprocating compressors. The compressor further comprises a drive shaft 18.

The term drive shaft is used herein to identify the drive mechanism for the operation of the compressor 17, be it a rotary shaft such as used in centrifugal and rotary screw compressors, or any of the various drive mechanisms used to operate the pistons of a reciprocating compressor.

The reverse osmosis apparatus 40 comprises a pressurized air inlet 41, the oxygen-enriched air outlet 12, the oxygen-reduced outlet 14, and an oxygen-permeable membrane 45. The oxygen-enriched air outlet 12 and the oxygen-reduced outlet 14 are separated by the membrane 45 disposed within the reverse osmosis apparatus 40 so as to separate the pressurized air into the oxygen-enriched stream on a first side 47 and the oxygen-reduced stream on a second side 48.

In operation, ambient air enters the ambient-air inlet 11 and is directed to the compressor 17 via the compressor inlet 13 so as to produce pressurized air through the compressor outlet 15. The ambient air is compressed to a sufficiently high state for continuous and efficient operation of the reverse osmosis apparatus 40, and thereupon the pressurized air is delivered to the pressurized air inlet 41 of the reverse osmosis apparatus 40. The membrane 45 is operable to permit only oxygen-enriched air there across and supplied to the oxygen-enriched outlet 12. Accordingly, the oxygen-enriched air is directed through the oxygen-enriched air outlet 12 and supplied to the intake 22 of the internal combustion engine 20. On the second side 48 of the membrane 45, the remaining, pressurized, oxygen-reduced air stream is directed through the oxygen-reduced outlet 14.

It will be apparent to those skilled in the art that a variety of manners of developing mechanical power for operating the compressor 17 may be utilized.

Figure 3:
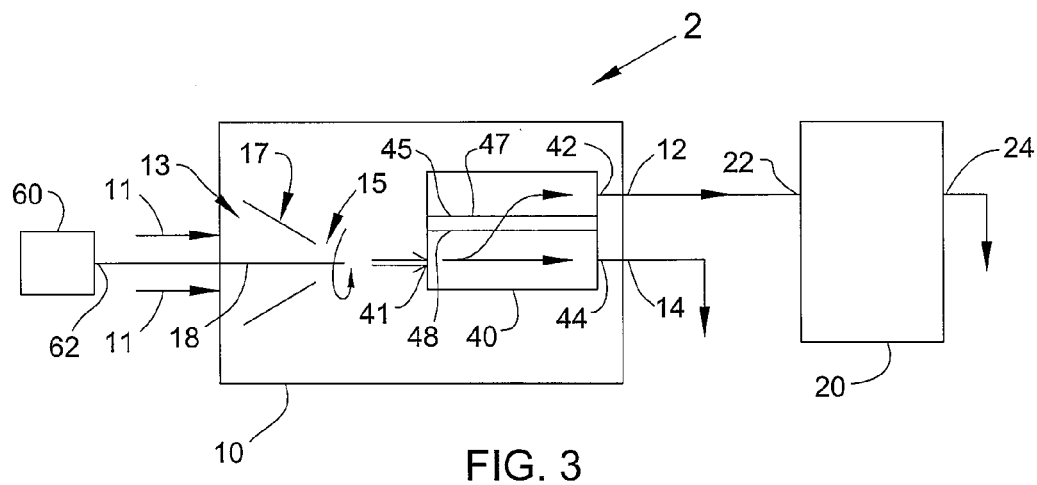
FIG. 3 is a schematic representation of a system comprising substantially the system of FIG. 1 further comprising a compressor motor, in accordance with an embodiment of the present invention.

FIG. 3 is a schematic representation of a system 2 comprising substantially system 1 of FIG. 1 further comprising a compressor motor 60, in accordance with an embodiment of the present invention. The compressor motor 60 includes a drive shaft 62 operably coupled for delivering mechanical power to the compressor drive shaft 18 so as to power the compressor 17. The compressor motor 60 may be powered by any suitable power source, such as, but not limited to, battery, alternator, and land-based electrical grid.

Figure 4:
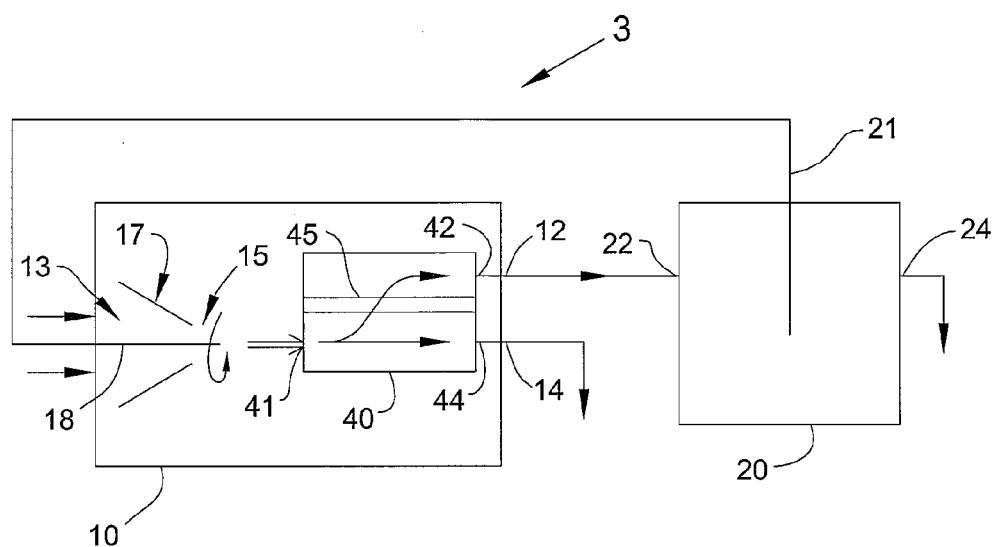
FIG. 4 is a schematic representation of a system comprising substantially the system of FIG. 1, wherein a drive shaft of the internal combustion engine is operably coupled to the compressor drive shaft so as to drive the compressor, in accordance with an embodiment of the present invention.

FIG. 4 is a schematic representation of a system 3 comprising substantially system 1 of FIG. 1, wherein an engine drive shaft 21 of the internal combustion engine 20 is operably coupled to the compressor drive shaft 18 so as to drive the compressor 17, in accordance with an embodiment of the present invention. The coupling of the engine drive shaft 21 and the compressor drive shaft 18 can be accomplished using any of various known methods and apparatus, such as, but not limited, direct coupling and belt or chain coupling.

Energy is required for the operation of the compressor 17. Various means are utilized to maximize energy efficiency and minimize energy consumption. In embodiments wherein the reverse osmosis unit 10 is stationary, a compressor 17 of a predetermined sized can be determined based on a given enriched oxygen output and specification of the internal combustion engine 20. Wherein the reverse osmosis unit 10 is moving, such as, but not limited to, a moving vehicle, the size and utilization of the compressor 17 may be adapted in accordance with the speed of the vehicle and the power requirements of the internal combustion engine. For example, for an automobile application, an output of oxygen-enriched air is required at a first predetermined value while the power output of the internal combustion engine is at a minimum, such as during idle where the automobile is at rest and there is no ram air pressure, and an output of oxygen-enriched air is required at a second predetermined value while the power output of the internal combustion engine is above the minimum, such as the automobile at highway speeds and there is substantial ram air pressure. The compressor may be sized by taking into consideration that ram air pressure can be utilized to augment or replace the compressor output, allowing for utilizing a smaller compressor, and/or bypassing the compressor at predetermined operating conditions.

Figure 5:
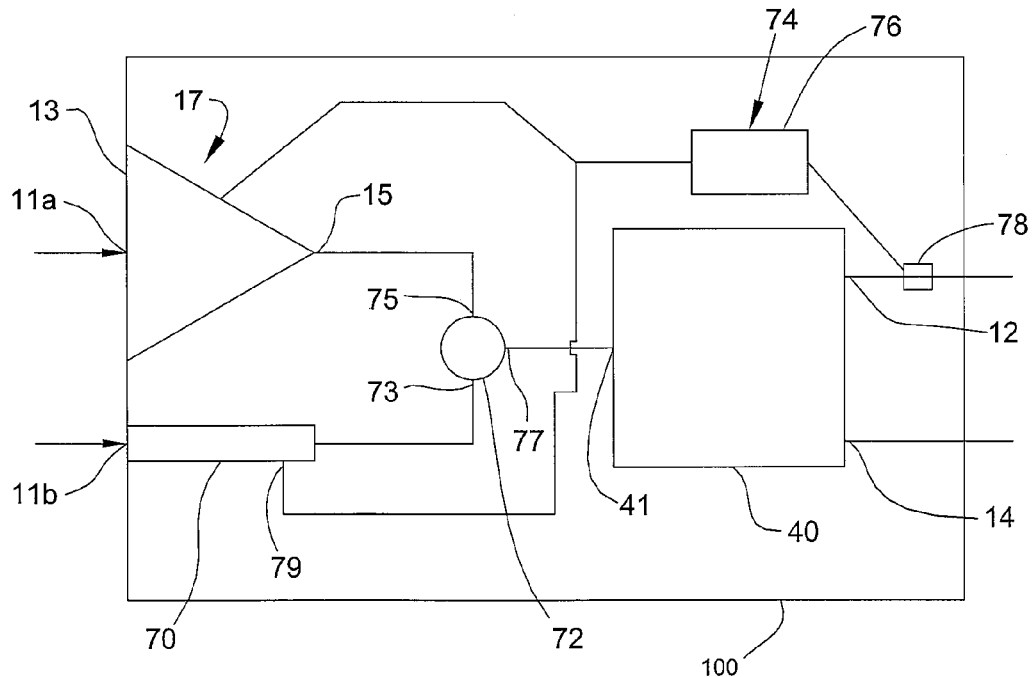
FIG. 5 is a schematic representation of an oxygen-enrichment reverse osmosis unit, in accordance with an embodiment of the present invention.

FIG. 5 is a schematic representation of an oxygen-enrichment reverse osmosis unit 100, in accordance with an embodiment of the present invention. The oxygen-enrichment reverse osmosis unit 100 comprises substantially the oxygen-enrichment reverse osmosis unit 10 of FIG. 2, further comprising apparatus for mixing and bypassing the output of the compressor and a valve control system 74. The oxygen-enrichment reverse osmosis unit 100 comprises an ambient air conduit 70 including an ambient-air inlet 11b for receiving ambient air. The ambient air conduit 70 supplies ambient air to a first valve inlet 73 of a valve 72. The compressor inlet 13 of the compressor 17 receives ambient air from an ambient-air inlet 11a and provides pressurized air from the compressor outlet 15. The compressor outlet is coupled to a second valve inlet 75 of the valve 72. Pressurized air is provided to the pressurized air inlet 41 of the reverse osmosis apparatus 40 via a valve outlet 77.

The valve control system 74 comprises a controller 76, an oxygen sensor 78, and a pressure sensor 79. The oxygen sensor is adapted to measure the concentration of oxygen at the oxygen-enriched outlet 12, and the pressure sensor 79 is adapted to measure ram pressure in the ambient air conduit 70.

The controller 76 and oxygen sensor 78 are operably coupled to the control valve 72 and the compressor 17. The controller is programmed to change the output of the compressor 17, including partially and fully shutting down the compressor and partially and fully bypassing it by partially and fully closing the second valve inlet 75, respectively, in response to the availability of ram air pressure supplied by the ambient air conduit 70. A feedback control means is provided to continually monitor and control the output of the compressor 17. Energy savings can be utilized by reducing the use of the compressor 17.

In another embodiment in accordance with the present invention, the valve control system 74 of the oxygen-enrichment reverse osmosis unit 100 of FIG. 5 is programmed to control the control valve 72 and the compressor 17 based only on the ram pressure measured by the pressure sensor 79, negating the need for the oxygen sensor 78.

Figure 6:
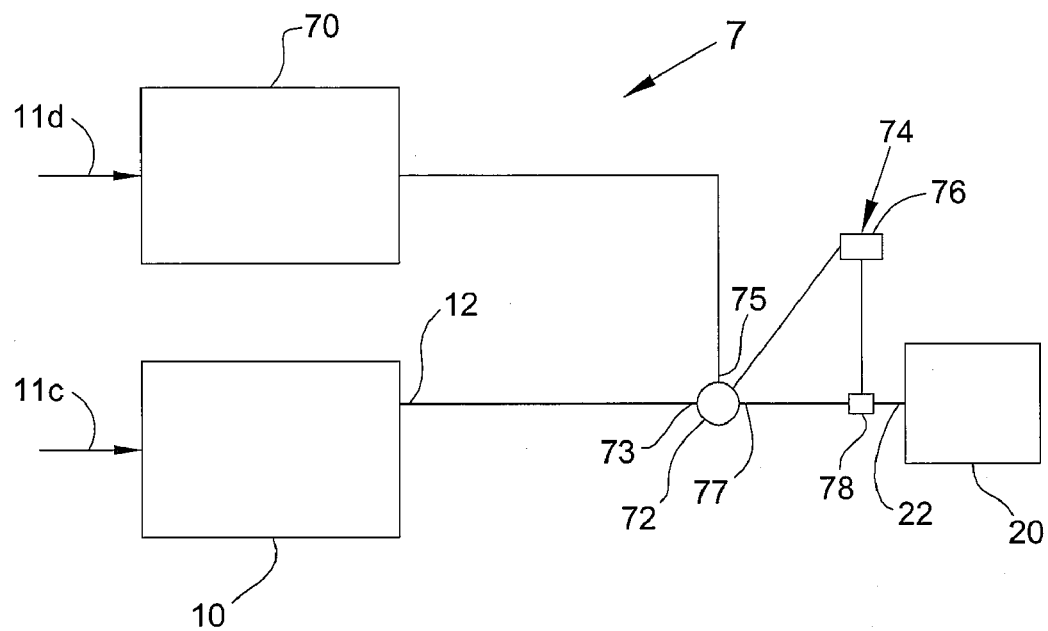
FIG. 6 is a schematic representation of a system comprising substantially the embodiment of FIG. 1 further comprising an ambient air conduit, a valve and a valve control system, in accordance with an embodiment of the present invention.

FIG. 6 is a schematic representation of a system 7 comprising substantially system 1 of FIG. 1 further comprising an ambient air conduit 70, a valve 72 and a valve control system 74, in accordance with an embodiment of the present invention. The ambient air conduit 70 includes an ambient-air inlet 11b for receiving ambient air. The ambient air conduit 70 supplies ambient air to a second valve inlet 75 of the valve 72. The oxygen-enriched outlet 12 of the reverse osmosis unit 10 is coupled to a first valve inlet 73 of the valve 72.

The valve control system 74 comprises a controller 76 and an oxygen sensor 78. The oxygen sensor 78 is adapted to measure the concentration of oxygen downstream of the valve 72. The controller 76 and oxygen sensor 78 are operably coupled to the control valve 72. The valve 72 is adapted to isolate or mix the output of the oxygen-enriched outlet 12 and the ambient air conduit 70. The controller is programmed to control the valve so as to control the mixture of the streams from the oxygen-enriched outlet 12 and the ambient air conduit 70 in response to the measure of the concentration of oxygen provided by the oxygen sensor 78. In this way, the oxygen concentration of the oxygen-enriched air supplied to the intake 22 of an internal combustion engine 20 can be controlled to a predetermined value or range of values.

Figure 7:
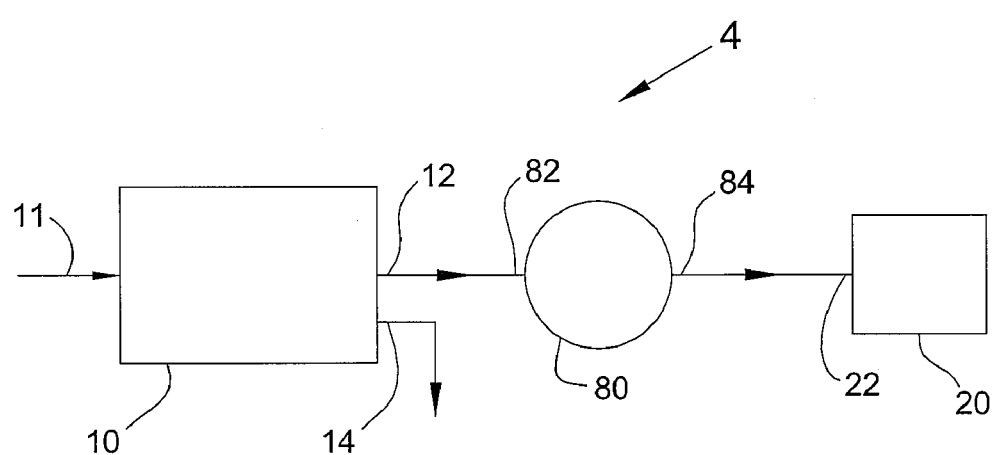
FIG. 7 is a schematic representation of a system comprising substantially the embodiment of FIG. 1 further comprising a storage tank coupled between the reverse osmosis unit and the internal combustion engine, in accordance with an embodiment of the present invention.

FIG. 7 is a schematic representation of a system 4 comprising substantially system 1 of FIG. 1 further comprising a storage tank 80 coupled between the reverse osmosis unit 10 and the internal combustion engine 20, in accordance with an embodiment of the present invention. The storage tank 80 comprises a tank inlet 82 and a tank outlet 84. The oxygen-enriched outlet 12 is coupled to the tank inlet 82 providing oxygen-enriched air to the tank for storage. The tank outlet 84 is coupled to the intake 22 of an internal combustion engine 20 so as to provide oxygen-enriched air to the intake 22. A number of significant advantages are provided by the storage tank 80, including, but not limited to: providing the ability to store excess capacity of the reverse osmosis unit 10; providing oxygen-enriched air to the internal combustion engine 20 when the reverse osmosis unit 10 is not operating or operating at reduced capacity; allowing the reverse osmosis unit 10 to operate at a constant output regardless of the needs of the internal combustion engine 20.

Figure 8:
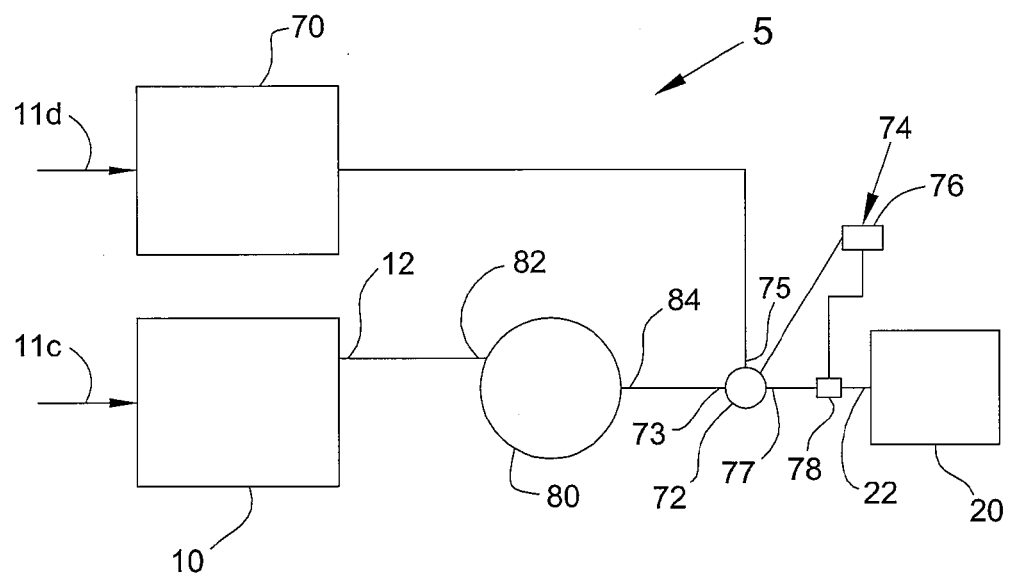
FIG. 8 is a schematic representation of a system comprising substantially the embodiment of FIG. 7 further comprising an ambient air conduit, a valve and a valve control system, in accordance with an embodiment of the present invention.

FIG. 8 is a schematic representation of a system 5 comprising substantially system 4 of FIG. 7 further comprising an ambient air conduit 70, a valve 72 and a valve control system 74, in accordance with an embodiment of the present invention. The ambient air conduit 70 includes an ambient-air inlet 11b for receiving ambient air. The ambient air conduit 70 supplies ambient air to a second valve inlet 75 of the valve 72. The tank outlet 83 of the storage tank 80 is coupled to a first valve inlet 73 of the valve 72.

The valve control system 74 comprises a controller 76 and an oxygen sensor 78. The oxygen sensor 78 is adapted to measure the concentration of oxygen downstream of the valve 72. The controller 76 and oxygen sensor 78 are operably coupled to the control valve 72. The valve 72 is adapted to isolate or mix the output of the tank outlet 84 and the ambient air conduit 70. The controller is programmed to control the valve so as to control the mixture of the streams from the tank outlet 84 and the ambient air conduit 70 in response to the measure of the concentration of oxygen provided by the oxygen sensor 78. In this way, the oxygen concentration of the oxygen-enriched air supplied to the intake 22 of an internal combustion engine 20 can be controlled to a predetermined value or range of values.

Figure 9:
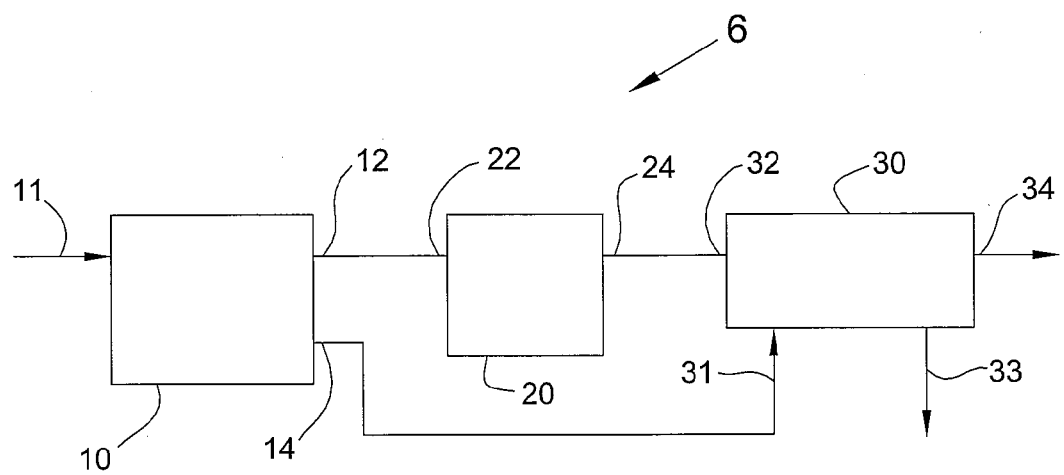
FIG. 9 is a schematic representation of a system comprising substantially the embodiment of FIG. 1 further comprising an exhaust heat exchanger, in accordance with an embodiment of the present invention.

In the embodiment shown in FIG. 1, the oxygen-reduced air supplied by the oxygen-reduced outlet 14 is simply exhausted to atmosphere. FIG. 9 is a schematic representation of a system 6 comprising substantially the system 1 of FIG. 1 further comprising a heat exchanger 30, in accordance with an embodiment of the present invention. The heat exchanger comprises an exhaust inlet 32 and an exhaust outlet 34 defining an exhaust passage (not shown), and a transfer fluid inlet 31 and a transfer fluid outlet 33 defining a transfer fluid passage (not shown) that is separate from but in thermal communication with the exhaust passage. The heat exchanger 30 is operable to extract heat from the exhaust of the internal combustion engine 20 and transfer the heat to the transfer fluid. The transfer fluid in this embodiment is the oxygen-reduced air provided by the oxygen-reduced outlet 14 coupled to the transfer fluid inlet 31. By reducing the temperature of the exhaust of the internal combustion engine 20, toxic emissions are reduced.

A method for increasing the performance of internal combustion engines comprises using a reverse osmosis unit to supply oxygen-enriched air to the intake of the combustion chamber of the internal combustion engine, in accordance with an embodiment of the present invention. Ambient air is passed through a reverse osmosis unit to produce an oxygen-enriched stream of air having an oxygen concentration greater than the ambient air, which is supplied to the intake of the combustion chamber of the internal combustion engine. In an embodiment, the oxygen-enriched stream of air comprises a ratio of oxygen to nitrogen of 40/60. In anther embodiment, the oxygen-enriched stream of air comprises a ratio of oxygen to nitrogen of 50/50.

Embodiments of the present invention provide oxygen-enriched air to the combustion chamber of an internal combustion engine. By way of these embodiments, ambient air is processed via reverse osmosis resulting in supplying oxygen-enriched air to the combustion chamber of an internal combustion engine in a ratio of oxygen to nitrogen greater than that of ambient air. The increased oxygen content of the air supplied to the combustion chamber enhances the combustion of the fuel. The resulting reduction in nitrogen supplied to the combustion chamber reduces the volume of gases within the combustion chamber that do not support combustion of the fuel. This reduction of combustion-inert gas directly corresponds to the reduced need for cylinder volume for the same power generation.

In an embodiment, the reverse osmosis unit oxygen-enriches the intake air to an oxygen/nitrogen ratio of 40/60 ratio, wherein only about half of the volume of this oxygen-enhanced air is needed in order to support about the same amount of combustion of fuel, as compared with a 20/80 ratio of ambient air. Therefore, a smaller cylinder volume, and thus a smaller engine, can produce approximately the same power using this oxygen-enriched air as compared with a bigger engine using ambient air. At the same time, the smaller engine saves consumption of fuel due to lower engine weight and more complete combustion. The smaller engine is also cheaper to build because it requires less material for fabrication.

Embodiments of the present invention provide oxygen-enriched air to an internal combustion engine, enriching the intake air to an extent greater than that of the ambient air. The range of oxygen enrichment includes enrichment just above that of ambient to 100% oxygen concentration. The benefits obtained by the degree of oxygen enrichment can depend on the application for, such as, but not limited to, internal combustion engines of automobiles, trucks, locomotives, ocean vessels and stationary engines. As stated above, just by changing the oxygen to nitrogen ratio from 20/80 to 40/60 results in substantial size reduction of the internal combustion engine. Where engine size is not an issue, increased power may be generated for the same size engine.

In addition, the higher oxygen level in the combustion chamber reduces carbon monoxide (CO) emissions, hydrocarbon and NOX emission by acting as if the fuel was oxygenated. The reduced concentration of nitrogen in the intake air leads directly to a reduction in NOX production. Further, the higher oxygen concentration of the intake air results in a more complete combustion process exponentially pushing the oxygenated gases of combustion to carbon dioxide and water. Further, energy output is increased by the combustion of carbon monoxide to carbon dioxide and the combustion of the hydrocarbon to its final combusted state rather than exhausting the partially combusted components.

The higher oxygen level in the intake air makes it unnecessary to have oxygenated fuel and thus the fuel is less expensive at a given level of emission. This makes vehicle operation less expensive. Also there is a reduced or no need for a catalytic converter due to lower emissions using oxygen-enriched intake air at a given emission level. Since the engine with a given power production level is smaller, there will be more room in the automobile to be used for other purposes, such as storing batteries and other equipment needed for hybrid vehicles.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A system comprising:
an oxygen-enrichment reverse osmosis unit including a reverse osmosis apparatus comprising a pressurized air inlet, an oxygen-enriched outlet, an oxygen-reduced outlet, and a membrane, the membrane separating the oxygen-enriched air and oxygen-reduced air, the reverse osmosis unit is adapted to accept pressurized ambient air into the pressurized air inlet and provide oxygen-enriched air out of the oxygen-enriched outlet and oxygen-reduced air out of the oxygen-reduced outlet, the oxygen-enriched air having a greater concentration of oxygen as the ambient air; and
an internal combustion engine comprising an intake is in fluid communication with a combustion chamber, the oxygen-enriched outlet of the reverse osmosis unit is in fluid communication with the intake,
wherein the reverse osmosis unit further comprises a compressor having a compressor inlet and a compressor outlet, the compressor adapted to accept ambient air into the compressor inlet and produce a supply of pressurized air to the pressurized air inlet of the reverse osmosis apparatus,
wherein the compressor comprises a compressor drive shaft adapted to drive the compressor so as to deliver pressurized air at a predetermined pressure to the pressurized air inlet of the reverse osmosis apparatus.

2. The system of claim 1, further comprising a compressor motor including a drive shaft operably coupled to the compressor drive shaft for delivering mechanical power to the compressor drive shaft so as to drive the compressor.

3. A system comprising:
an oxygen-enrichment reverse osmosis unit including a reverse osmosis apparatus comprising a pressurized air inlet, an oxygen-enriched outlet, an oxygen-reduced outlet, and a membrane, the membrane separating the oxygen-enriched air and oxygen-reduced air, the reverse osmosis unit is adapted to accept pressurized ambient air into the pressurized air inlet and provide oxygen-enriched air out of the oxygen-enriched outlet and oxygen-reduced air out of the oxygen-reduced outlet, the oxygen-enriched air having a greater concentration of oxygen as the ambient air; and
an internal combustion engine comprising an intake is in fluid communication with a combustion chamber, the oxygen-enriched outlet of the reverse osmosis unit is in fluid communication with the intake, further comprising a storage tank having a tank inlet and a tank outlet, the tank inlet in fluid communication with the oxygen-enriched outlet and the tank outlet in fluid communication with the intake of the internal combustion engine, further comprising:

a valve having a first valve inlet, a second valve inlet and a valve outlet; and a valve control system comprising a controller and an oxygen sensor, and wherein the reverse osmosis unit further comprises an ambient air conduit having an ambient air inlet, the ambient air conduit in fluid communication with the second valve inlet, the tank outlet in fluid communication with the first valve inlet, and the valve outlet in fluid communication with the intake of the internal combustion engine, the valve adapted to preferentially mix the output from the ambient air conduit and the tank outlet, the oxygen sensor adapted to measure the concentration of oxygen at the intake, the controller adapted to control the first and second inlets of the valve so as to control the oxygen concentration of the output of the valve in relationship to the signal of the oxygen sensor.

4. A system comprising:

an oxygen-enrichment reverse osmosis unit including a reverse osmosis apparatus comprising a pressurized air inlet, an oxygen-enriched outlet, an oxygen-reduced outlet, and a membrane, the membrane separating the oxygen-enriched air and oxygen-reduced air, the reverse osmosis unit is adapted to accept pressurized ambient air into the pressurized air inlet and provide oxygen-enriched air out of the oxygen-enriched outlet and oxygen-reduced air out of the oxygen-reduced outlet, the oxygen-enriched air having a greater concentration of oxygen as the ambient air; and an internal combustion engine comprising an intake is in fluid communication with a combustion chamber, the oxygen-enriched outlet of the reverse osmosis unit is in fluid communication with the intake, further comprising a heat exchanger, the heat exchanger comprising:

an exhaust inlet;

an exhaust outlet, the exhaust inlet and exhaust outlet defining an exhaust passage therebetween;

a transfer fluid inlet; and a transfer fluid outlet, the transfer fluid inlet and transfer fluid outlet defining a transfer fluid passage therebetween and separate from but in thermal communication with the exhaust passage, the heat exchanger adapted to extract heat from exhaust of the internal combustion engine and transfer the heat to the transfer fluid, the transfer fluid being the oxygen-reduced air provided by the oxygen-reduced stream coupled to the transfer fluid inlet.

5. A system comprising:

an oxygen-enrichment reverse osmosis unit including a reverse osmosis apparatus comprising a pressurized air inlet, an oxygen-enriched outlet, an oxygen-reduced outlet, and a membrane, the membrane separating the oxygen-enriched air and oxygen-reduced air, the reverse osmosis unit is adapted to accept pressurized ambient air into the pressurized air inlet and provide oxygen-enriched air out of the oxygen-enriched outlet and oxygen-reduced air out of the oxygen-reduced outlet, the oxygen-enriched air having a greater concentration of oxygen as the ambient air; and an internal combustion engine comprising an intake is in fluid communication with a combustion chamber, the oxygen-enriched outlet of the reverse osmosis unit is in fluid communication with the intake, wherein the oxygen to nitrogen ratio of the oxygen-enriched air is 50 to 50.

\* \* \* \* \*